United States Patent [19]

Bolger

[11] 3,899,666

[45] Aug. 12, 1975

[54] INTEGRAL CORRELATION AND TRANSVERSE EQUALIZATION METHOD AND APPARATUS

[75] Inventor: Thomas Vincent Bolger, Pennsauken, N.J.

[73] Assignee: RCA Corporation, New York, N.Y.

[22] Filed: Oct. 24, 1973

[21] Appl. No.: 409,066

[52] U.S. Cl. ............ 235/181; 235/151.53; 325/42; 333/28; 333/30 R

[51] Int. Cl. ............ G06g 7/19; H03h 9/00

[58] Field of Search ......... 235/181, 151.53; 333/18, 333/28, 29, 30, 70

[56] References Cited

UNITED STATES PATENTS

| | | | |
|---|---|---|---|
| 3,489,848 | 1/1970 | Perreault | 333/29 |
| 3,551,837 | 12/1970 | Speiser et al. | 333/30 R |
| 3,621,221 | 11/1971 | Cann | 235/181 |
| 3,631,232 | 12/1971 | Perreault et al. | 333/29 |
| 3,651,316 | 3/1972 | Gibson | 333/18 |
| 3,701,147 | 10/1972 | Whitehouse | 333/30 R |
| 3,745,463 | 7/1973 | Klein | 333/28 |
| 3,770,949 | 11/1973 | Whitehouse et al. | 333/30 R |

OTHER PUBLICATIONS

Peckels et al: Substitution of a delay line for a whole bank of filters. IBM Tech. Discl. Bull. Vol. 8, No. 11, April 1966, pp. 1498–1499.

Möhrman: Some methods for the adaptive adjustment of equalizers for fast data transmission. Nachrichten Techinsche Zeiting, 1971, No. 1, p. 18–29.

Shreve et al: Surface Wave Parametric Signal Processing. Electronics Letters. Dec. 1971, Vol. 7, No. 25, p. 764–766.

*Primary Examiner*—Felix D. Gruber
*Attorney, Agent, or Firm*—Edward J. Norton; Joseph D. Lazar

[57] ABSTRACT

An apparatus providing integrally combined correlation and transversal equalization functions. A preferred form of the apparatus in a single structure comprises a surface wave acoustical device. Illustrative uses include suppressed sidelobe correlators of radar-type signals including phase coded signals.

3 Claims, 8 Drawing Figures

| TE TAP | $t_0$ | $t_1$ | $t_2$ | $t_4$ | $t_5$ | $t_6$ | $t_7$ |
|---|---|---|---|---|---|---|---|
| #1 | -1 | +1 | +1 | | | | |
| #2 | | | -3 | +3 | +3 | | |
| #3 | | | | | -1 | +1 | +1 |
| COMPOSITE | -1 | +1 | -2 | +3 | +2 | +1 | +1 |
Fig. 4.
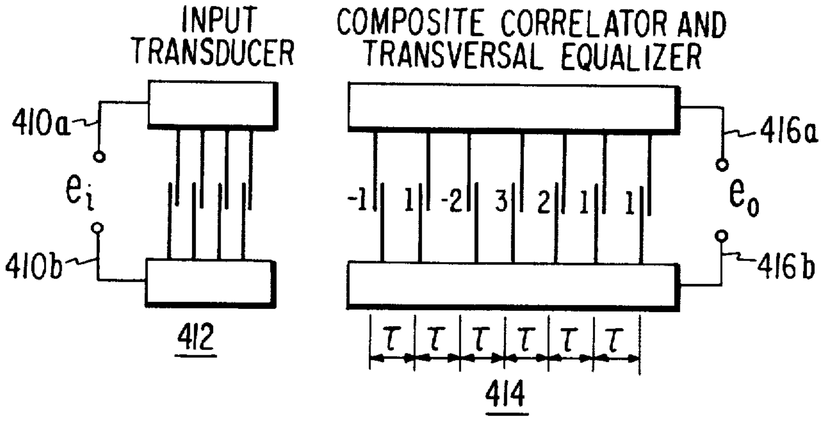
Fig. 5.
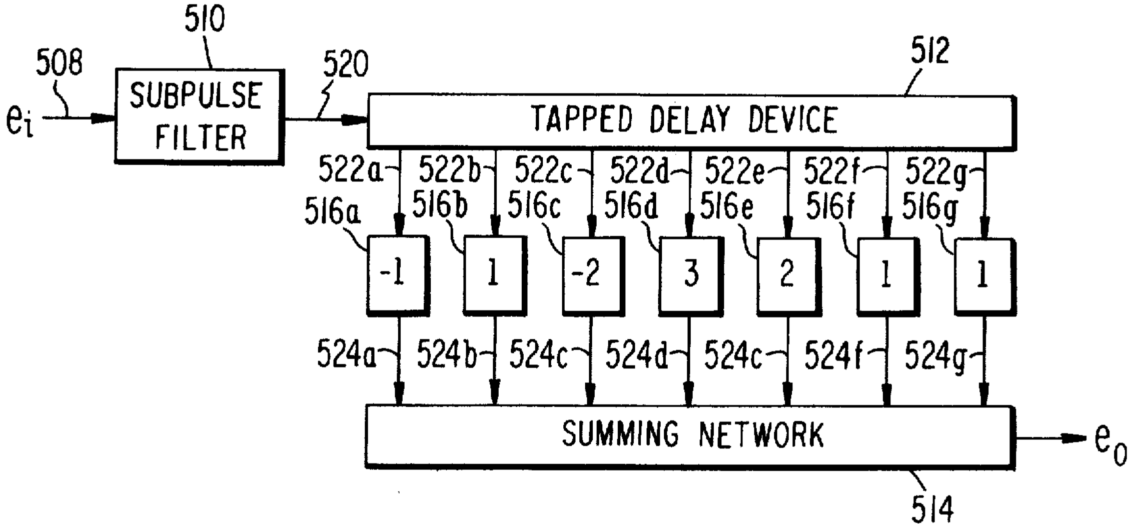
Fig. 6.

INTEGRAL CORRELATION AND TRANSVERSE EQUALIZATION METHOD AND APPARATUS

BACKGROUND OF THE INVENTION

1. Field of the Invention

This invention generally relates to correlation and transverse equalization wherein the suppression of time sidelobes result from the correlation of signals present in communication or radar systems and, more particularly, relates to the suppression of time sidelobes resulting from the compression of pulse signals present in a pulse-compression radar system.

2. Description of the Prior Art

Correlated signals generated by conventional correlation techniques useful in communication systems, radar systems, or the like, may include undesirable time sidelobes. The use of correlation in communication or radar systems often requires reducing or suppressing such time sidelobes to relatively lower signal levels than the correlated signal.

As known in the art, the correlation function used in prior art correlators is any mathematical function serving to perform any one of a number of operations such as signal detection, signal shaping, expansion, compression, or the like, as desired for a particular application. For example, a pulse-compression radar comprising a correlator contemplates the transmission of a long pulse, preferably coded, as by phase or frequency modulation, and the processing of the received echo to develop a relatively narrow pulse by the use of a correlator which functions as a compression filter. It is well known that the principal advantage of transmitting a long pulse rather than transmitting a short pulse is that the average power capability of the radar is increased without the generation of high-peak power signals and without increasing the pulse repetition frequency. Reference is made, for more detailed and background information, to Chapter 20 of the "Radar Handbook" edited by M. Skolnik and published by McGraw-Hill in 1970, entitled "Pulse-Compression Radar" and written by E. C. Farnett, T. B. Howard and G. H. Stevens, for a description of pulse-compression radar systems and the various coded signals used in such systems.

A variety of suitable signals such as linear and nonlinear FM, phase coded and time-frequency coded signals may be utilized in pulse-compression radar systems. When such coded echo signals are compressed by a suitable correlator forming the compression filter, the resulting signal, as is well known, has essentially the shape of a sampling function, that is, a sin $x/x$ shape, with time sidelobes extending on either side of the main or compressed pulse. The ratio of the largest time sidelobe amplitude, as well as the smaller time sidelobes, to the compressed pulse amplitude depends on the type of signal which is used in the pulse-compression radar. For instance, if a linear FM waveform is used, the first and largest of the time sidelobes is, undesirably, only 13.2 db below the peak of the compressed pulse.

Correlators used in pulse-compression systems may be constructed by either lumped circuit techniques or weighted tapped delay line techniques. In general, the use of a tapped delay line as a correlator provides for separating the time duration of the signal to be processed into a number of discrete portions, operating on each portion in a prescribed manner such as amplitude weighting or phase shifting, and summing the separate resultant portions to produce the output signal. For example, a compression filter for a phase-coded signal may be implemented in the form of a tapped delay line wherein the taps are spaced at intervals corresponding to the time duration of a pulse representing a bit (binary digit) of the phase-coded signal and wherein the operation at each tap is a phase shift of 0° or 180° in accordance with the phase code of the phase-coded signal. The tapped delay line may also be formed in a variety of suitable devices such as a coaxial delay line or a shift-register. In addition, the correlator (compressor) in its entirety may be replaced by an electro-acoustic surface wave delay device. Electro-acoustical surface wave devices are readily reproducible and highly stable in comparison to other suitable devices used to implement correlators and the like and are therefore preferred to these devices.

Efforts have been made heretofore to provide coded signals for use in pulse-compression radar systems which when compressed in a compression filter type of correlator result in a minimum sidelobe level. Such signals are considered to be optimally coded. One such optimal code is the well known Barker code sequence, which is manifested in a phase coded signal. Barker codes are described in more detail in Chapter 20 of Sholnik's "Radar Handbook," cited supra, and in Chapter 17 of a book entitled "Communications Theory" edited by W. Jackson and published by Academic Press, Inc., in 1953, entitled "Group Synchronization of Binary Digital Systems" authored by R. H. Barker. When a 13-bit Barker coded signal is processed in a compression filter arranged to compress the 13-bit Barker coded signal, six uniform sidelobes are generated on either side of the compressed pulse. Although the Barker code is an optimal code for the suppression of sidelobes, the level of these sidelobes is still only 22.3 db below the peak of the compressed pulse which sidelobe level is inadequate for many radar and communication system applications.

In order to improve the performance of a compression filter, transversal equalizers have been provided at the output of such compression filter correlators to suppress the time sidelobes generated when a signal is processed in the correlator. A transversal equalizer, as well known, is a filter which suppresses undesired portions of a signal occurring at predetermined times during the duration of the signal by adding signals in opposition to the undesired portions of the signal to the signal at the times at which the undesired portions of the signal occur. Thus, the undesired sidelobes adjacent the desired compressed pulse can be suppressed by the use of transversal equalizers or filters. Transversal filters are constructed in accordance with tapped delay line techniques similar to the techniques discussed supra for correlators. For example, the design of a transversal equalizer may consist of the steps of evaluating the output signal of the associated correlator, either by analytical methods or from laboratory observation, with the use of an oscilloscope or the like, and then selecting the proper amplitude weight needed to be applied to the respective taps of the transversal equalizer to suppress the amplitude of the sidelobes to the desired level.

There are several known analytical methods for selecting the amplitude weights at the taps of transversal equalizer. Such analytical techniques are discussed in an article entitled "Range Sidelobe Suppression for Barker Codes," by A. W. Rihaczek and R. M. Golden appearing in the IEEE Transactions on Aerospace and Electronics Systems, Vol. AES-7, No. 6, November 1971, an article entitled "A Method of Sidelobe Suppression in Phase-Coded Pulse Compression Systems," written by E. L. Key, E. N. Fowle, and R. D. Haggerty, appearing in M.I.T. Lincoln Labs. Tech-Report, 209, November 1959, and an article entitled "Transversal Equalizers for Suppressing Distortion Echoes in Radar Systems," written by W. R. Pratt, appearing in Rome Air Development Center Dept. PADC-TDR-62-580, April, 1963.

In another analytical technique, known as the matrix inversion technique, taps weights of the transversal equalizer are determined by multiplying the inverted matrix associated with the time response of the correlator with the desired resultant time response of the transversal equalizer. In addition, there are several iterative type of methods particularly appropriate for use with a digital computer for iteratively selecting the amplitude weight of the transversal equalizer until the amplitude of the sidelobes falls to or below an acceptable predetermined level. One such iterative technique known as the Himsworth Simplex technique is discussed in an article by F. R. Himsworth in the Transactions of the Institute of Chemical Engineering, Vol. 40, page 345, 1962.

Nothing known heretofore provides for a universal technique combining transverse equalization and correlation in an integral structure. While it is known to apply a weighting function to the structure of a correlator to suppress time sidelobes in a manner much like the superposition of amplitude modulation on frequency modulation, such procedures are inadequate for integrally combining the functions of correlation and transversal equalization in a single structure in general. For example, U.S. Pat. No. 3,633,132 entitled "Energy-Weighted Dispersive Acoustic Delay Line of the Surface Wave Type," issued to Pierre Hartemann on Jan. 4, 1972, discloses a dispersive electro-acoustical surface-wave delay device for weighting a signal at the same time that it compresses or expands the signal in order to suppress time sidelobes. The purpose of this Hartemann patent is directed to the suppression of time sidelobes when a linear FM signal is compressed or expanded and provides a dispersive delay line having an envelope of taps or teeth of dissimilar lengths conforming to a weighting function, for example, manifested as a Gaussian curve, the Taylor approximation of a DolphTchebychev function, or the Hamming function. Another example of a prior art structure is described in U.S. Pat. No. 3,663,899, entitled "Surface-Wave ElectroAcoustic Filter," issued to Eugene Dieulesaint and Pierre Hartemenn on Apr. 2, 1970, providing a dispersive surface wave delay line wherein the envelope of the teeth or taps of the delay line conform to a weighting function representing the Fourier transform of the transfer function of the delay line when operated as a filter. It should be appreciated that the technique taught by the above-cited patents, is the superposition of a weighting function on a correlation function within the structure of an electroacoustic surface wave device, and that such an arrangement is not an integral combination of correlating and transverse equalization. This superposition technique is particularly inappropriate for use with signals of the type including phase coded, pseudo random or non-linear FM signals since signals of this type do not lend themselves to the classical closed form solutions for transversal equalization as is the case for linear FM signals. Thus, there is a need for apparatus and a method for integrally combining correlation and transversal equalization in systems requiring the compression of phase coded, pseudo random and non-linear FM signals and the like as well as for systems requiring the compression of FM signals.

SUMMARY OF THE INVENTION

An apparatus is provided for correlating an input signal and simultaneously suppressing time sidelobes resulting from the correlation operation below a predetermined level within a single integral structure. The input signal is received by a tapped delay device including a predetermined number of weighted taps for weighting the input signal when it reaches one of the taps. The tapped delay line is adapted to conduct the input signal in sequence between adjacent taps during respective time intervals. Summing means are provided to sum the weighted input signal generated at each tap to thereby generate an output signal. According to the invention the taps are iteratively arranged with respect to one another and the weights of the taps are iteratively selected until the output signal is equal to the correlated form of the input signal while at the same time the output signal has sidelobes below the predetermined level.

BRIEF DESCRIPTION OF THE DRAWING

FIG. 4 is a chart illustrating the determination of the weighting function of a structure, according to the present invention, integrally combining the correlator and transversal equalizer of FIG. 1.

FIG. 5 is a schematic diagram of an integral or composite electro-acoustical surface wave delay device combining the correlator and transversal equalizer of FIG. 1 according to the present invention.

FIG. 6 is a block diagram of another embodiment integrally combining the correlator and transversal equalizer of FIG. 1 according to the present invention.

DETAILED DESCRIPTION OF THE PREFERRED EMBODIMENTS

Figure 1:
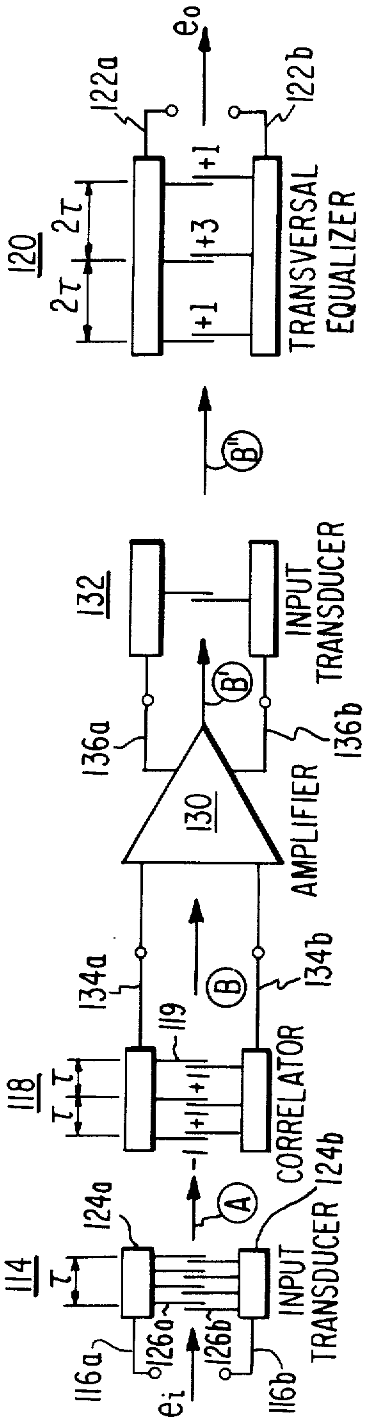
PRIOR ART Fig. 1.
FIG. 1 is a schematic of dispersive electroacoustical surface wave delay devices utilized in the prior art for separately performing the functions of correlation and transversal equalization.

Prior Art - FIG. 1

FIG. 1 is a schematic diagram of prior art electro-acoustical surface wave delay devices having separate portions for performing the separate functions of correlation and transversal equalization. Waveforms $e_1$, A.

Figure 2:
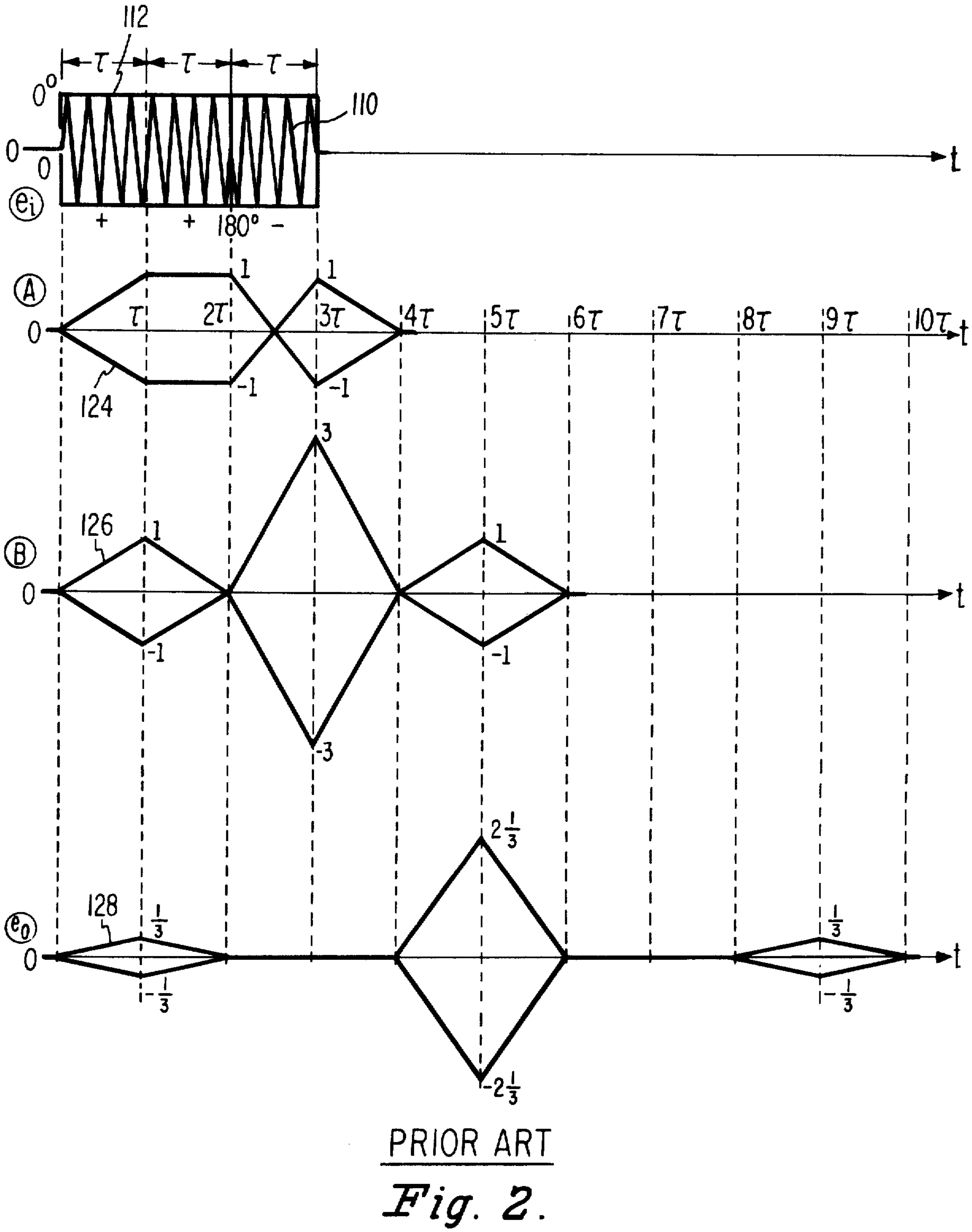
PRIOR ART Fig. 2.
FIG. 2 is a graphical representation of waveforms useful in understanding prior art device of FIG. 1.

B, and $e_o$ shown in FIG. 2 are keyed to FIG. 1 as an aid in understanding the operation of the structure of FIG. 1. Waveform $e_i$ is a phase coded signal having the form of a 3-bit Barker code and, for example, may be the received echo signal in a pulse compression radar system. Waveform $e_i$ is divided into three portions, each portion being a bit of the code and having a duration $\tau$. Waveform $e_i$ comprises a carrier signal 110 having an envelope 112 manifesting the constant amplitude and phase reversals of carrier signal 110. When the carrier signal 110 is a normal sine wave, i.e., a sine wave having a 0° phase shift, the corresponding bit of the Barker code is indicated by +. When the carrier 110 of waveform $e_i$ is an inverted sine wave, i.e., a sine wave having a 180° phase shift, the corresponding bit of the Barker code is indicated by *a* −.

Waveform $e_i$ is conducted to an input transducer 114 through electrical leads 116*a* and 116*b*. The output signal A is applied to correlator 118, the output of which is processed and coupled by coupling transducers to transversal equalizer 120, as will be described in detail. Input transducer 114, correlator 118, input transducer 132 and transversal equalizer 120 each are suitable electroacoustical surface wave delay devices. The construction and operation of such devices are described in U.S. Pat. No. 3,360,749 entitled "Elastic Wave Delay Device," issued to E. K. Sittig on Dec. 26, 1967, and in an article entitled "Acoustic Surface Wave Device" by Dr. J. Heighway, appearing in the April, 1973, issue of Electron magazine. An electro-acoustical surface-wave device typically includes a substrate of piezoelectric material such as quartz, cadmium sulphide, lithium niobate, piezoelectric ceramic, or the like. Two comb-shaped structures, for instance 124*a* and 124*b*, are arranged on one face of the substrate so that the teeth of the structures are interlaced in a spaced relationship to one another. Pairs of relatively closely spaced teeth, for instance 126*a* and 126*b*, form a tap of the electro-acoustical surface wave delay device which function to weigh a signal in a predescribed or predetermined manner when the signal reaches the position or location of the tap. The delay between adjacent taps is determined by the spacing between the taps and the magnitude of the weight of each tap is determined by the amount of overlap between the teeth of that tap. The relative algebraic sign of the weight of each tap is dependent on which tooth of the tap precedes the other. By convention, for the purposes of this description, a tap will have a negative weight when the tooth of an upper (as seen in the several drawing figures) comb-shaped transducer precedes the tooth of a lower comb-shaped transducer and a tap will have a positive weight when the tooth of the lower comb-shaped transducer precedes the tooth of the upper comb-shaped transducer.

Input transducer 114 is arranged such that the spacing between consecutive taps corresponds to the period or "subpulse width," as such spacing is sometimes known in the art, of carrier signal 110. The length of the comb-shaped transducer over which the taps of input transducer 114 extend corresponds to the time duration $\tau$ of one bit of the Barker coded input signal $e_i$. In this configuration, input transducer 114 is a matched filter; i.e., input transducer 114 is a filter matched to the carrier signal 110. The output response of input transducer 114 to input waveform $e_i$ is graphically represented by waveform A of FIG. 2 having an envelope 124 whose shape will be subsequently explained. In waveforms A, B and $e_o$, only the respective corresponding envelopes, without the details of the carrier signal 110 is shown to simplify the drawing. In addition, the amplitudes in waveforms $e_i$, A, B and $e_o$ shown in FIGS. 2 and 8, to be described, are normalized amplitudes.

The shape of envelope 124 of waveform A generated by transducer 114 may be understood in a graphical sense by plotting waveform $e_i$ beginning at a time corresponding to each tap position of input transducer 114 with the appropriate amplitude according to the tap weight (in this case the weight of each tap is the same) and summing the resultant delayed responses. Thus, if waveform $e_i$ is plotted beginning at zero time (leftmost vertical dotted line of FIG. 2) corresponding to the position of the first tap of input transducer 114, and then repeated at a time interval of one subpulse width for each tap in input transducer 114, the sum of these waveforms will result in envelope 124. The envelopes of the subsequently generated waveforms B and $e_o$ are obtained in a similar manner to that of waveform A as just described.

Signal A is acoustically coupled to correlator 118. Correlator 118 is an electro-acoustical surface wave delay device which is advantageously constructed on the same substrate as input transducer 114. Correlator 118 has a tap weighting function which is matched to the code of the input waveform $e_i$. That is, if the input waveform $e_i$ has a three-bit Barker code comprising the sequence +, +, −, (illustrated as $e_i$ in FIG. 2) correlator 118 is constructed to have consecutive taps having weights −, +, +, respectively, wherein each tap is separated by a distance corresponding to time duration $\tau$. It should be noted that the correlator weighting function has an inverse relationship to Barker coded input signal $e_i$ so that the sequence of input signal $e_i$ will align with the sequence of correlator 118 since the first portion of the input signal $e_i$ is the first to reach the last tap 119.

The signal of waveform B is the output of correlator 118 in response to an input signal corresponding to waveshape A. Waveshape B has a main or compressed pulse having a relative peak amplitude of three (typically indicated by the numeral "3") and sidelobes, on either side of the main pulse, having a relative peak amplitude of one. The amplitudes in the respective sidelobes are a significant portion of the amplitude of the main pulse and the presence of the main pulse is thereby obscured.

Signal B is coupled to the input of amplifier 130 by electrical leads 134*a* and 134*b*. The output of amplifier 130 is connected to wideband input transducer 132 by electrical leads 136*a* and 136*b*. Amplifier 130 may be any suitable double-ended amplifier for interfacing electrical signals to electro-acoustical surface wave delay devices as are well known in the art. Wideband input transducer 132 is suitably formed of an electro-acoustical surface wave device having a single tap and is made wideband so as not to add unwanted components to waveform B as it is coupled from correlator 118 to transversal equalizer 120. Waveforms B' and B'' have essentially the same waveshape 126 as waveform B but have respective amplitudes in accordance with the amplifications of amplifier 130 and wideband input transducer 132.

Signal B'' is acoustically coupled to transversal equalizer 120. Transversal equalizer 120 is an electro-acoustical surface wave delay device constructed to have a suitable weighting function to suppress the sidelobes of waveform B'' which is essentially equal waveform B. Transversal equalizer 120 is provided with three taps, separated by a distance corresponding to $2\tau$ and having respective weights of +1, +3, +1. Signal $e_o$, the output of transversal equalizer 120, has a ratio of main pulse amplitude to sidelobe amplitude of 7 to 1, which is a significant improvement over the main pulse amplitude to sidelobe amplitude ratio of 3 to 1 of waveform B produced at the output of correlator 118. Output signal $e_o$ is conducted from transversal equalizer 120 to output terminals through electrical leads 122*a* and 122*b* for use as desired such as range determination within a pulsecompression radar system.

Figure 3:
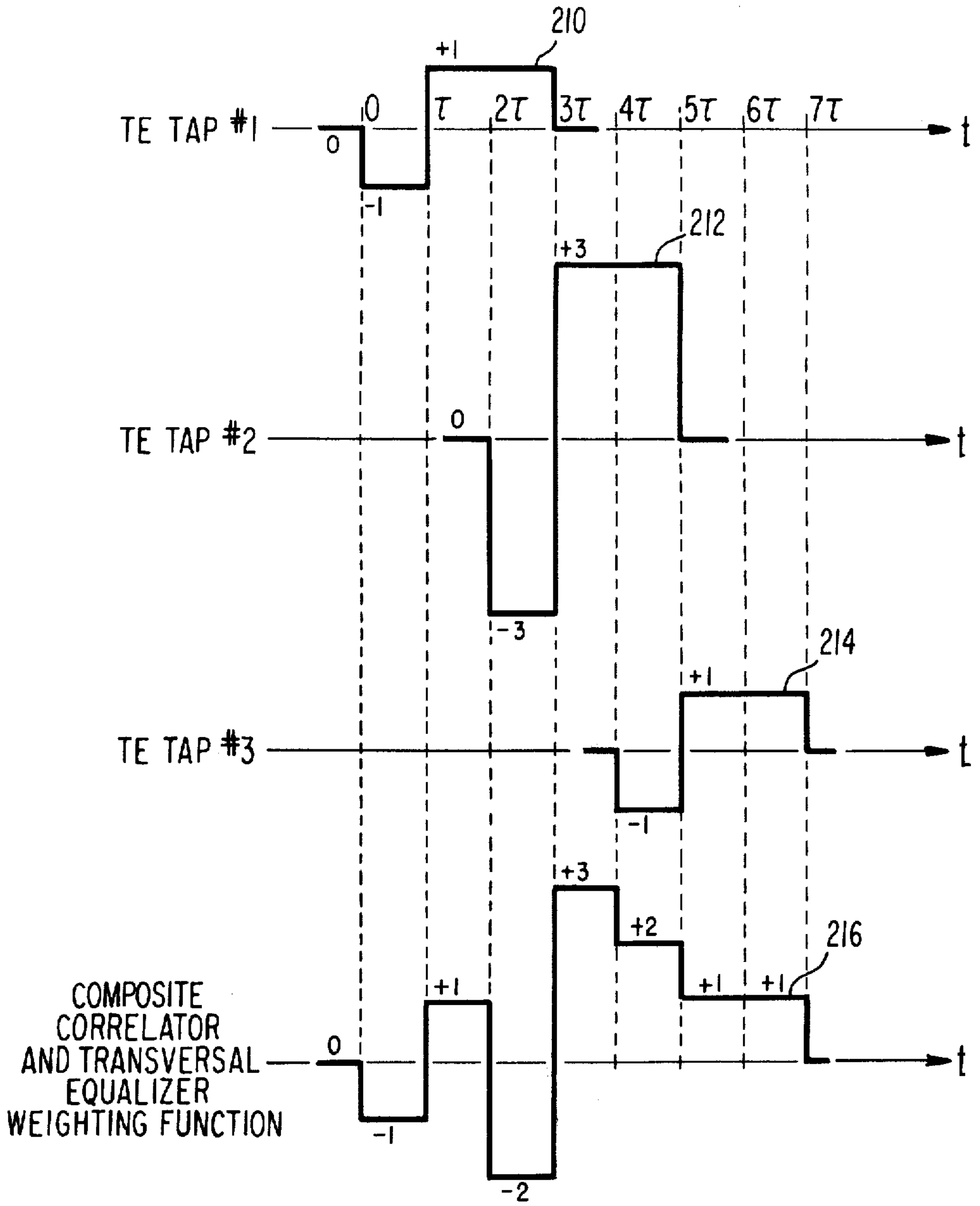
FIG. 3 is a graphical representation of waveforms illustrating the determination of the weighting function of a structure, according to the present invention, integrally combining the correlator and transversal equalizer of FIG. 1.

FIG. 3 is a graphical representation of waveforms useful in understanding the manner by which the correlator and transversal equalizer of the prior art structure of FIG. 1 may be integrally combined, according to the present invention, into a single composite device performing both the functions of correlation and transversal equalization. Design procedures for correlator and transversal equalizer devices are well known in the art and were previously referenced herein above. It should be understood that the technique to be described is useful generally for combining any two or more weighting functions and is not limited to combining the functions of correlation and transversal equalization. For instance, the technique to be described to practice the invention may be used to combine two cascaded transversal equalizers into a single structure. It should also be understood by those skilled in the art that devices may now be constructed to combine two prior art cascaded devices respectively defined by weighting functions irrespective of which type of prior art device is first in the cascaded sequence. That is, for instance, a transversal equalizer may precede a correlator as well as follow the correlator and a combined device may be constructed to replace the two prior art cascaded devices according to the invention. It should further become apparent to those skilled in the art that the technique according to the present invention may be used any number of successive times to combine a plurality of structures performing various respective weighting functions into a single structure.

In arranging the composite device, according to the invention, the weighting function of the first of the cascaded devices to be combined is assumed to be generated by each tap of the second of the cascaded devices at time intervals and with weights according to the taps of the second device. The summation of the response of each tap of the second device is then the weighting function of the composite device. For example, in FIG. 3 the weighting function of correlator 118 of FIG. 1 is assumed to be performed separately by each tap of transversal equalizer 120 of FIG. 1. Thus, as shown in FIG. 3, the weighting function of correlator 118 is assumed to be generated at TE tap No. 1 of transversal equalizer 120 multiplied by a weight of one (waveform 210), at TE tap No. 2 of transversal equalizer 120, separated from TE tap No. 1 by a distance corresponding to $2\tau$, multiplied by a weight of three (waveform 212) and at TE tap No. 3 of transversal equalizer 120, separated from TE tap 2 by a distance corresponding to $2\tau$, multiplied by a weight of one (waveform 214). The summation of waveforms 210, 212 and 214 results in the weighting function (waveform 216) of the composite device which integrally combines the functions of correlator 118 and transversal equalizer 120 of FIG. 1.

Waveform 216 of FIG. 3, manifesting the weighting function of a device which integrally combines the operation of correlator 118 and transversal equalizer 120, may be mathematically defined as a particular form of the general expression $$f_3(t) = \sum_{k=0}^{k=n-1} f_1(t - k\Delta t) f_2(k\Delta t) \quad (1)$$

In expression (1), $f_1$ is the weighting function expressed as a function of time $t$, of the first of the cascaded devices, in the particular case illustrated in FIG. 3 the weighting function of correlator 118, and $f_2$ is the weighting function, expressed as a function of time $t$, of the second of the cascaded device, in the case illustrated in FIG. 3 the weighting function of transversal equalizer 120. The second weighting function $f_2$ is divided into n intervals of time; each interval having a time duration of $\Delta t$. The symbol k is an integer between 0 and $n-1$. In the example illustrated in FIG. 3, the weighting function of the transversal equalizer is formed by three rectangular portions, that is, $f_2 = +1$ from $t = 0$ to just up to $t = 2\tau$, $f_2 = +3$ from $t = 2\tau$ to just up to $t = 4\tau$, $f_2 = +1$ from $t = 4\tau$ to just up to $t = 6\tau$ and $f_2 = 0$ after $t = 6\tau$. Therefore, in the example illustrated in FIG. 3, $\Delta t$ is equal to $2\tau$ and $n$ is equal to 3. It should be appreciated that weighting function $f_2$ of the second cascaded device may contain non-rectangular portions and that for this situation $\Delta t$ can be selected to any suitable interval to approximate the weighting function of any desired degree as is well known. It will be useful in understanding expression (1) to understand that a function having the form $f_1(t - k\Delta t)$ is equal to the function $f_1(t)$ except that it begins at a time t equal to $k\Delta t$ and that the expression $f_2(k\Delta t)$ is equal to the value of $f_2$ at a time $t$ equal to $k\Delta t$. Therefore waveform 210 is the graphical representation of $$f_1(t - k\Delta t) f_2(k\Delta t) \quad (2)$$

when $k = 0$, waveform 212 is the graphical representation of $$f_1(t - k\Delta t) f_2(k\Delta t) \quad (3)$$

when $k = 1$, waveform 214 is the graphical representation of $$f_1(t - k\Delta t) f_2(k\Delta t) \quad (4)$$

when $k = 2$ and waveform 216 is the graphical representation of $f_3(t)$.

FIG. 4 is a chart giving an abbreviated version of the information contained in the graphs of FIG. 3 and expression (1). The left-hand column of the chart of FIG. 4 lists the taps of transversal equalizer 120 of FIG. 1. The columns labeled $t_0$ to $t_7$ list the amplitudes of the weighting function of correlator 118 assumed to be generated at each tap of transversal equalizer 120 of FIG. 1 at successive times $t_0$ through $t_7$. The tap weights of the composite device are determined by adding the weights within a column for each column corresponding to times $t_0$ through $t_7$. The position of the taps of the composite device correspond to the intervals of time between successive times $t_0$ through $t_7$. The composite weighting function as derived in FIG. 3, expression (1) or FIG. 4 may now be used to construct in any suitable form, such as an electro-acoustical surface wave delay device, a single integral structure to carry out the functions of correlation 118 and transversal equalizer 120. It should be noted that the manifested technique illustrated in FIG. 4 is most useful when the correlator function follows a rectangular pattern such as the correlator 118 of FIG. 1. For a more complex correlator function having, for instance, triangular of sinusoidal portions, a technique similar to the technique illustrated in FIG. 3 or utilizing expression (1) is generally more suitable than the technique illustrated in FIG. 4 and should be so used. It should be appreciated by those skilled in the art that if the composite weighting function contains non-rectangular portions such as linearly sloped, sinusoidal, or exponential portions, the capability of the composite device to produce the composite weighting function will depend on the number of taps used to approximate the the weighting function.

FIG. 5 is a schematic diagram of a single integral electro-acoustical surface wave delay device embodying the invention arranged for performing the combined functions of correlator 118 and transversal equalizer 120 of FIG. 1 in accordance with the function illustrated in FIGS. 3 and 4. Input transducer 412 is a matched filter similar to the matched filter of input transducer 114 of FIG. 1 and receives input waveform $e_i$ of FIG. 1 through electric leads 410*a* and 410*b*. Composite correlator and transversal equalizer 414 is provided with taps at intervals corresponding to time duration $\tau$ having respective weights in accordance to the composite weighting function of FIGS. 3 and 4. Output signal $e_o$ of composite device 414 is available at output terminals connected to the comb-like transducers by electric leads 416*a* and 416*b*. It is to be noted that the single integral composite device 414 of FIG. 5 produces an output signal $e_o$ which is identical to output signal $e_o$ of the two prior art devices (correlator 118 and transversal equalizer 120) of FIG. 1. As in FIG. 1, the output signal $e_o$ has a main lobe amplitude to sidelobe amplitude of 7 to 1. More significant, sidelobe suppression according to the invention will be described hereafter in relation to the embodiment illustrated in FIG. 7.

It will be appreciated by those skilled in the art that there are certain advantages to combining the prior art structures of FIG. 1 into a single structure. For instance, the structure of FIG. 5 has less insertion loss than is present than in the prior art apparatus of FIG. 1. In addition, the art work necessary in the manufacture of the prior art apparatus is more complex, and therefore more susceptable to error, than the art work required to manufacture the structure of FIG. 5. The reduction of insertion loss and the reduction of art work and the like become significant advantages of the present invention over the prior art when large numbers of tapped delay devices are combined into a single integral structure according to the present invention.

It will be appreciated by those skilled in the art that there are many suitable structures, such as tapped delay lines and the like, which perform the same functions as electro-acoustical surface wave delay devices.

FIG. 6 is a block diagram of another structure embodying the composite correlator and transversal equalizer of FIG. 5. Input waveform $e_i$ is conducted to subpulse filter 510 by electrical conductor 508. Subpulse filter 510 is a filter adapted to remove carrier 110 and leave only envelope 112 of input waveform $e_i$ of FIG. 1. Such filters are well known in the art and may, for example, include a synchronous detector or other suitable device. The output of subpulse filter 510 is conducted through electrical conductor 520 to tapped delay device 512. Tapped delay device 512 may be any one of a number of suitable tapped delay devices wherein a pulse can be shifted sequentially from one tap to another in uniform time intervals. For instance, delay device 512 may be a tapped delay line including a coaxial cable or a digital shift register. Each tap of tapped delay device 512 is respectively connected to a weighting device 516*a* through 516*g* by a respective electrical conductor 522*a* through 522*g*. Each tap of tapped delay device 512 is located in accordance with the composite weighting function of FIG. 3 or 4. Each weighting device 516*a* through 516*g* has a weight in accordance with the composite weighting function of FIGS. 3 or 4. Each weighting device 516*a* through 516*g* may be formed by a suitable amplification device, a digital to analog conversion circuit or other suitable device. The output of each weighting device 516*a* through 516*g* is respectively connected through electric leads 524*a* through 524*g* to summing network 514. Summing network 514 is any suitable device which is capable of summing electrical signals such as an operational amplifier. Weighting devices 516a through 516g and summing network 514 may be suitably formed by a single operational amplifier configuration wherein the weight associated with each tap is set by selecting the value of the corresponding input resistor of the operational amplifier. Output signal $e_o$ is available at the output of the summing device and has essentially the same envelope as envelope 128 of output signal $e_o$ of FIG. 1.

As discussed above, the art heretofore has not provided apparatus of integrally combined weighting functions. According to the present invention, such apparatus are constructed as a composite device by integrally combining the weighting functions performed by separate devices. This is achieved by initially selecting a predetermined number of weighted taps for te composite device and iteratively altering the weights, spacing and then number of taps in the group until the composite device produces an acceptable output with a given input. It should be appreciated that using this technique does not require the need to determine the response of any of the separate cascaded devices individually performing a respective weighting function in accordance with the prio art. For example, if such iterative technique is employed to design a composite correlator and transversal equalizer, it is not necessary to determine the response of the correlator to a given coded input signal. All that is required according to the present invention is to select an acceptable main pulse amplitude to sidelobe amplitude ratio in the output signal with a given input signal.

Figures 7, 8:
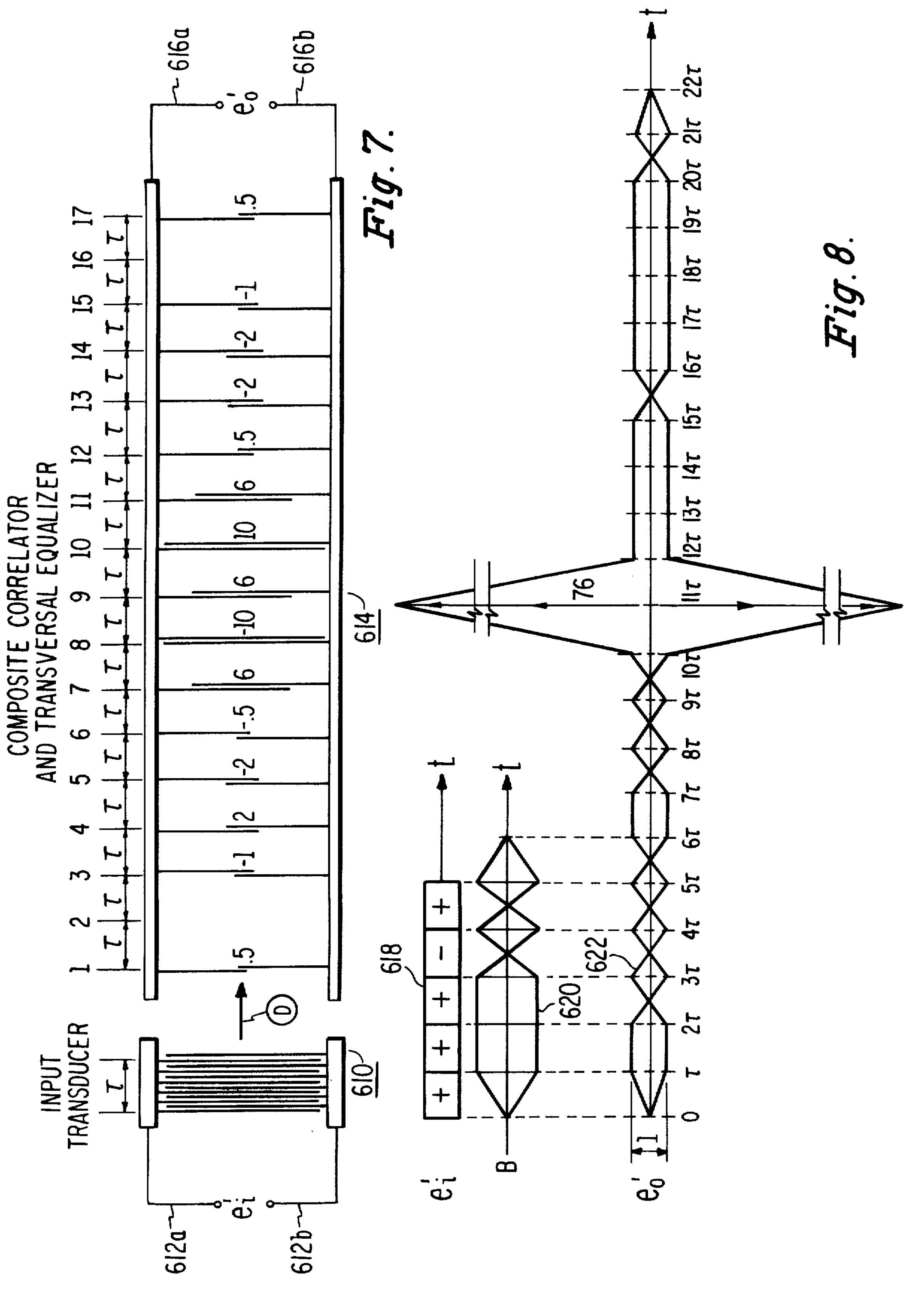
FIG. 7 is a schematic diagram of an integral or composite electro-acoustical surface wave delay device forming a composite correlator and transversal equalizer for a five-bit Barker coded signal embodying the present invention.
FIG. 8 is a graphical representation of waveforms useful in understanding the apparatus of FIG. 7.

FIGS. 7 and 8 are respectively a schematic diagram and associated waveforms of a composite correlator and transversal equalizer for a five bit Barker coded input signal $e_i'$ actually designed by the use of an iterative computer aided design process according to the invention, the structure for which taking the form of an electro-acoustical surface wave delay device. Input signal $e_i'$ has an envelope 618 defining the 5-bit Barker coded sequence +, +, +, −, +. Input waveform $e_i'$ is conducted to input transducer 610 through electrical leads 612*a* and 612*b*. Input transducer 610 is matched to the carrier of input waveform $e_i'$. Waveform D, having envelope 620, is the response of input transducer 610 to input waveform $e_i'$. Once waveform D and the desired main lobe amplitude to sidelobe amplitude ratio of the composite correlator and transversal equalizer are known, an iterative type of computer program is used to determine the weights and positions of the taps for the composite structure. Electro-acoustical surface wave device 614 is a structure embodying the composite weighting function determined by such a computer program to iterate a predetermined number of times to determine the tap weight for a composite correlator and transversal equalizer and positions for waveform D. Output signal $e_o'$ is provided at output terminals connected to electro-acoustical surface wave device 614 by electric leads 616*a* and 616*b*. The wave shape of the resultant output of $e_o'$ has a main pulse amplitude to sidelobe amplitude ratio of 76 to 1, which is equivalent to 37.8 d*b*. It is to be appreciated that this ratio of sidelobe suppression is a figure of merit of significance in this art. It is possible through further iterations to improve this performance by increasing this ratio. It should be noted that no particular iterative routine is required although certain routines produce optimum results more quickly than others.

What is claimed is:

1. An apparatus for correlating a continuous input phase-coded analog signal comprising a carrier with phase coded modulations and simultaneously suppressing time sidelobes resulting from said correlation to a predetermined level, said apparatus having input means including an input electro-acoustic surface wave device responsive to said input phase-coded analog signal for generating an acoustical surface wave, said input device being arranged as a filter matched to said carrier of said analog signal, said input surface wave device being deposited on a substrate capable of supporting an acoustical surface wave, comprising:

an electro-acoustic surface wave device formed of a set of interdigitated comb-shaped electrodes deposited on said substrate in position relative to said input means to receive an acoustical surface wave therefrom, and to generate in response to said surface wave an electrical signal having a spectral response in accordance with the relative spacing and overlap of said electrodes, output means coupled to said electrodes to provide an instantaneous output electrical signal from said lastmentioned device in continuous response to said surface wave, said output electrical signal being equal to a compressed form of said input analog signal and having time sidelobes below said predetermined level, the spacing and overlap of said electrodes being arranged in accordance with a weighting function $f_3(t)$ having the form, -Continued $$f_3(t) = \sum_{k=0}^{k=n-1} f_1(t-K\Delta t)\cdot f_2(k\Delta t)$$

where $f_1(t)$ is a first given weighting function $f_2(t)$ is a second given weighting function, $t$ is time, $\Delta t$ is a predetermined incremental interval of time, n is the number of said $\Delta t$ time increments over which $f_2(t)$ is defined and $k$ is an integer between 0 and $n-1$.

2. An apparatus according to claim 1, wherein said first weighting function is the weighting function of a correlator and said second weighting function is the weighting function of a transversal equalizer.

3. An apparatus according to claim 1, wherein said first weighting function is the weighting function of a transversal equalizer and said second weighting function is the weighting function of a correlator.

* * * * *